United States Patent
Bonnet

(10) Patent No.: US 7,470,114 B2
(45) Date of Patent: Dec. 30, 2008

(54) ROTOR BLADE FOR A WIND ENERGY TURBINE

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 11/460,494

(22) Filed: Jul. 27, 2006

(65) Prior Publication Data
US 2007/0041829 A1    Feb. 22, 2007

(30) Foreign Application Priority Data
Aug. 17, 2005   (EP) ................... 05107564

(51) Int. Cl.
F04D 29/66    (2006.01)

(52) U.S. Cl. .................. 416/226; 416/500

(58) Field of Classification Search .............. 416/80, 416/226, 500, 103, 106, 107, 233
See application file for complete search history.

(56) References Cited

U.S. PATENT DOCUMENTS 6,626,642 B1 *   9/2003   Veldkamp .............. 416/79

FOREIGN PATENT DOCUMENTS

| DE | 19741627 | 3/1999 |
|----|----------|--------|
| WO | WO 95/21327 | 8/1995 |
| WO | WO 96/11337 | 4/1996 |

* cited by examiner

Primary Examiner—Richard Edgar
(74) Attorney, Agent, or Firm—GE Global Patent Operation

(57) ABSTRACT

The rotor blade for a wind energy turbine comprising a longitudinal shell defining a root to be connected to a hub of a rotor, a tip, a forward edge and a rearward edge, the shell having a spar including two spar caps connected via at least one shear web arranged between the forward and rearward edges of the shell and extending in the longitudinal direction of the shell, and a structural damping system arranged within the shell and having a pendulum including a dumped sandwich beam and a mass element located at one end of the beam. The beam comprises a sandwich structure including at least three layers comprising at least one damping middle layer arranged between and connected to outer layers of an elastic material. The sandwich beam is connected to the at least one shear web in a cantilevered manner such that the mass element is proximal to the tip of the shell and the beam can be oscillated in a direction towards and away from the forward and rearward edges of the shell.

8 Claims, 2 Drawing Sheets

ROTOR BLADE FOR A WIND ENERGY TURBINE

BACKGROUND

1. Field of The Invention

The present invention relates to a passive structural damping system for a wind turbine blade and, in particular, to a rotor blade for a wind energy turbine comprising a damping system for damping at least the first edge-wise structural bending mode of the wind turbine blade.

2. Related Prior Art

The blades of the rotor of a wind energy turbine are subjected to diverse edge-wise structural bending modes, meaning that the rotor blades are oscillating within the plane of rotation. Among these bending modes the first edge-wise structural bending mode typically has a merely poor structural damping effect (about 1% only) resulting from a typical blade construction. The first edge-wise structural bending mode typically has a frequency from 1-5 Hz and can be easily excited by wind turbulences. The first edge-wise structural bending mode can induce dynamic loads to all the components of the drive shaft of the wind energy turbine such as high blade root bolting dynamic loads at resonance frequency, high dynamic torque variation, increasing gearbox gear stages and bearings wear, and possibly high dynamic loads to the main bearing and bedplate, generating additional fatigue.

It is basically known to provide structural damping of the first edge-wise bending mode by means of a moving mass at the tip of the blade. U.S. Pat. No. 6,626,642 suggests to provide an oscillating mass on an articulated shaft connected to the shell of the blade by means of a specific loss bearing. WO-A-95/21327 provides a classical mass-spring-damper arranged within the tip portion of the shell of a rotor blade.

The known damping systems are complicated in construction and difficult to integrate into the internal construction of a rotor blade. Accordingly, there is a need for a damping system which is easy to manufacture and install, provides robustness and is failure-free and, accordingly, substantially maintenance-free.

SUMMARY OF THE INVENTION

The problems listed above are solved according to the invention by providing a rotor blade for a wind energy turbine comprising a longitudinal shell defining a root that connects to a hub of a rotor, a tip, a forward edge and a rearward edge, the shell having a spar including at least one shear web arranged between the forward and rearward edges of the shell and extending in the longitudinal direction of the shell, a vibration damper arranged within the shell and having a pendulum including a beam and a mass element located at one end of the beam, the beam comprising a sandwich structure including at least three layers comprising at least one damping middle layer arranged between and connected to outer layers of a elastic material, and the beam is connected to the at least one shear web in a cantilevered manner such that the mass element is proximal to the tip of the shell and the beam can be oscillated between the forward and rearward edges of the shell.

The present invention provides a wind energy turbine blade passive structural damping system comprising a sandwiched beam connected to the internal construction of the rotor blade in a cantilever manner such that the beam is bent while oscillating towards and away from the forward and rearward edges of the blade. The sandwiched cantilever beam comprises at least three layers of different materials, the outer (upper and lower) ones being elastic while the middle layer comprises a damping material such as a viscoelastic, elastomeric, or frictional material. The cantilever beam can comprise several damping layers arranged between the elastic layers while also additional elastic and damping layers can be arranged outside of the layer arrangement mentioned before. In other words, the sandwiched cantilever beam comprises several elastic and damping layers laminated onto each other.

In particular, the laminated sandwiched cantilever beam comprises a viscoelastic or elastomeric damping layer encompassed by upper and lower steel layers or layers of another elastic metal. Instead of an elastomeric or viscoelastic damping layer, the damping layer may comprise friction generating materials such as entangled fibres or mesh wires, e.g. made of metal or plastics or for enhancing friction, by contact surface machining of the interface of two material layers of the sandwiched cantilever beam contacting each other. The damping effect of the elastic sandwiched cantilever beam according to the invention results from the generation of shear damping losses in the damping layer when the beam is bending. Accordingly, each damping material which causes shear losses can be used for the damping layer or damping layers of the cantilever beam.

According to the invention, the sandwiched cantilever beam functions as a pendulum including the beam and a mass element located at one end of the beam. It is to be noted that the mass element need not be a separate element located at the one end of the beam. The end portion of the beam as such can be regarded as the mass element although an additional mass element attached or otherwisely integrated into or mounted to the end of the beam is preferred in order to add additional mass to the beam. The sandwiched cantilever beam oscillates within the plane of rotation of the rotor blade. Due to its sandwich structure, the beam is unlikely to oscillate or bend in a direction perpendicular to its preferred bending direction. Accordingly, the sandwiched cantilever beam according to the invention is sensitive to edge-wise oscillations while preventing flap-wise oscillations which generally stabilizes the rotor during operation.

In another aspect of the present invention the blade comprises internal bump stoppers arranged for damping a potential contact of the moving end of the sandwiched cantilever beam with the blade, in order to limit sandwiched cantilever beam mass displacement within the blade cavity As mentioned before, the sandwiched cantilever beam is mechanically connected to the internal stiffening construction of the blade. This stiffening construction comprises a spar including spar caps and at least one shear web connecting the spar caps. The sandwiched cantilever beam can be directly fastened to the at least one shear web preferably by fastening bolts and/or laminated and glued extending through the at least one shear web and the sandwiched cantilever beam. The at least one shear web can be encompassed, at its end facing the sandwiched cantilever beam, by the outermost layers of the sandwiched cantilever beam. However, it is also possible that the sandwiched cantilever beam is connected at one side of the at least one shear web only.

According to the invention there is provided a rotor blade with a passive structural damping system formed as a pendulum made of a cantilever beam fixed to a blade shear web. The pendulum provides for a resonance of the cantilever beam occurring in the first bending mode of the blade. The cantilever beam is provided as a laminated sandwiched structure, in particular a laminated steel/elastomer/steel sandwiched structure which irrespective of the material used for the individual layers, can have many superimposed layers. Damping occurs when the laminated sandwiched cantilever beam is bending which creates shear damping losses in the then shear constrained elastomer of damping material layer(s). The major benefits of the damping system according to the invention are damping addition can be up to 10 times of original blade damping of at least first edge-wise blade structural mode with very low added mass (typically less than 1%), mechanical construction integration, easy of manufacture and installation, possibility to upgrade existing blades, construction robustness, failure-safety by principle and, substantially maintenance-free.

BRIEF DESCRIPTION OF THE DRAWINGS

The present invention will be explained in more detail referring to the drawings in which.

DETAILED DESCRIPTION OF A PREFERRED EMBODIMENT

Figure 1:
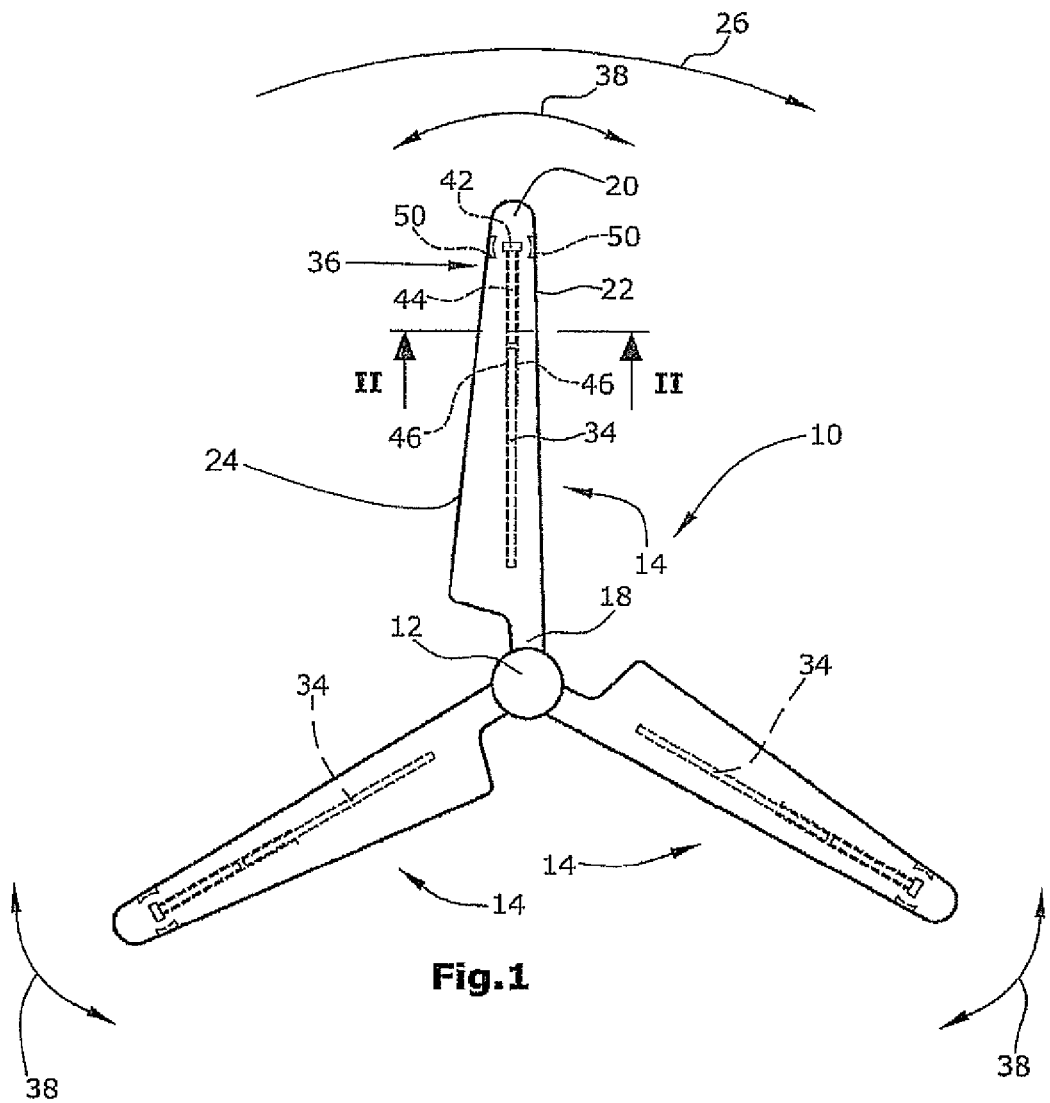
FIG. 1 shows an example of a three-blade wind energy turbine rotor wherein a sandwiched cantilever beam is located in each of the blades and connected to at least one of the respective shear webs thereof.

FIG. 1 shows a front view of a rotor 10 for a wind energy turbine comprising a hub 12 and three rotor blades 14 radially extending from the hub 12. Each of the rotor blades 14 comprises a shell 16 defining a root 18 and a tip 20 limiting the longitudinal dimension of the rotor blade 14 (see also FIG. 2). The shell 16 of each rotor blade 14 further defines a leading or forward edge 22 and a trailing or rearward edge 24 with respect to the direction of rotation (see arrow 26 in FIG. 1) of the rotor 10. The construction of the shell 16 of each rotor blade 14 further comprises a spar 28 which includes two spar caps 30,32 arranged within the shell 16, and at least one shear web 34 extending within the shell 16 and connecting the spar caps 30,32. The individual portions of the shell 16 and its spar 28 comprise sandwiched and laminated structures as basically known by those skilled in the art of manufacturing rotor blades.

Figure 2:
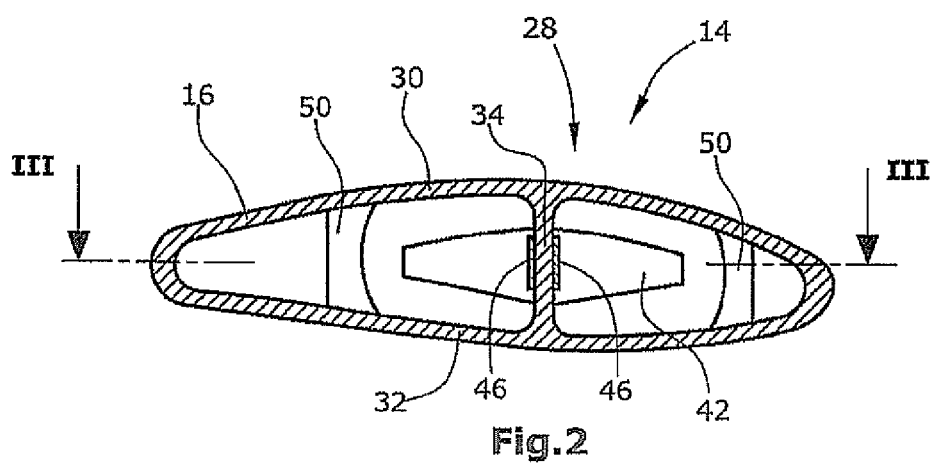
FIG. 2 shows a cross-sectional view through one of the rotor blades taken along the line II-II of FIG. 1.
Figure 3:
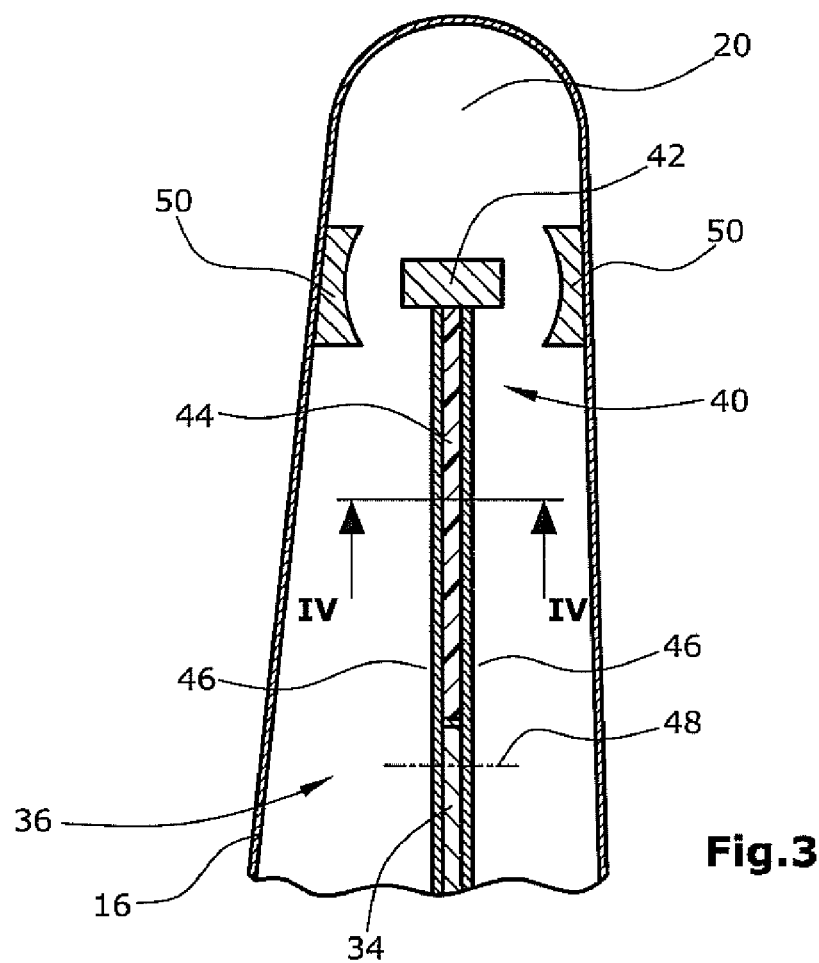
FIG. 3 shows a horizontal cross-sectional view through the tip portion of a rotor blade on a larger scale.
Figure 4:
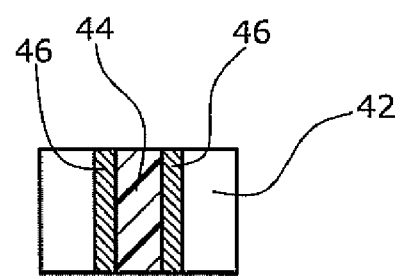
FIG. 4 shows a cross-sectional view through the sandwiched cantilever beam taken along the line IV-IV of FIG. 3.

As can be seen from FIGS. 1 and 2 as well as from FIG. 3, at the radially outward end of the at least one shear web 34 of each rotor blade 14, there is attached a pendulum 36 functioning as a counterweight for damping and neutralizing to a certain extent the first edge-wise blade bending mode. This bending mode results in an oscillation of each rotor blade 14 in the plane of rotation as shown by the arrows 38 in FIG. 1.

According to the preferred embodiment of the present invention, the pendulum 36 in each of the rotor blades 14 comprises a sandwiched cantilever beam 40 with an additional mass element 42 attached to one of the ends of the beam 40. The sandwiched cantilever beam 40 is fastened to the shear web 34 such that the mass element 42 is proximal to the tip 20 of the blade 14. The cantilever beam 40 in this embodiment comprises a laminated steel/elastomer/steel sandwiched structure comprising a middle layer 44 of an elastomeric or viscoelastic damping material and two outer layers 46 made of steel. Those skilled in the art will recognize that other combinations of damping and elastic materials for the individual layers of the sandwiched cantilever beam layer can be used.

As can be further seen in FIG. 3, in this embodiment the outer steel layers 46 at the end of the beam 40 attached to the shear web 34 project beyond the middle layer 44 so as to encompass the shear web 34 at its opposite sides. Within this part of the beam 40 and shear web 34 several fastening bolts 48 extend through the shear web 34 and outer layers 46, thereby fastening the beam 40 and/or laminated within the shear web 34 in an easy manner to the internal stiffening construction of the blade 14.

In the extension of the oscillating movement path of the mass element 42 of the pendulum 36 there are arranged bump stoppers 50 located at the inner sides of the shell 16 at its forward and rearward edges 22,24, respectively. These bump stoppers 50 prevent damage of the rotor blade 14 upon extreme oscillating movements of the pendulum 36 which may occur when the rotor blades in the operating orientation of the blade as shown e.g. in FIGS. 1 and 3, are subjected to increased accelerations.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A rotor blade for a wind energy turbine, comprising
a longitudinal shell defining a root that connects to a hub of a rotor, a tip, a forward edge and a rearward edge, the shell having a spar including at least one shear web arranged between the forward and rearward edges of the shell and extending in the longitudinal direction of the shell,
a vibration damper arranged within the shell and having a pendulum including a beam and a mass element located at one end of the beam,
the beam comprising a sandwich structure including at least three layers comprising at least one damping middle layer arranged between and connected to outer layers of an elastic material, and
the beam is connected to the at least one shear web in a cantilevered manner such that the mass element is proximal to the tip of the shell and the beam can be oscillated between the forward and rearward edges of the shell.

2. The rotor blade according to claim 1, wherein the at least one middle layer of the sandwiched cantilever beam comprises a viscoelastic, elastomeric or frictional material.

3. The rotor blade according to claim 1, further comprising bump stoppers arranged within the shell for damping a potential contact of the mass element of the pendulum with the shell.

4. The rotor blade according to claim 1, wherein the outer layers of the sandwiched cantilever beam comprise metal.

5. The rotor blade according to claim 4, wherein the metal is steel.

6. The rotor blade according to claim 1, wherein the sandwiched cantilever beam is fastened to the at least one shear web of the spar of the shell.

7. The rotor blade according to claim 6, wherein the sandwiched cantilever beam is fastened to the at least one shear web by means of fastening bolts extending through the at least one shear web of the spar of the shell and through the beam.

8. The rotor blade according to claim 6, wherein the sandwiched cantilever beam is laminated and glued to the at least one shear web by means of integrated lamination and fixtures extending through the at least one shear web of the spar of the shell and through the beam.

* * * * *